United States Patent [19]
Schneider

[11] Patent Number: 5,948,834
[45] Date of Patent: Sep. 7, 1999

[54] SHAPED PARTS OUT OF INTUMESCENT MIXTURES AND A METHOD FOR THE MANUFACTURE OF SAME

[76] Inventor: Friedhelm Schneider, Zur Platte, D-51580 Reichshof-Hahn, Germany

[21] Appl. No.: 09/183,210

[22] Filed: Oct. 30, 1998

Related U.S. Application Data

[63] Continuation-in-part of application No. 08/790,419, Jan. 30, 1997.

[30] Foreign Application Priority Data

Jan. 31, 1996 [DE] Germany .......................... 196 03 424

[51] Int. Cl.⁶ ............................... C09K 21/14; C08J 9/32
[52] U.S. Cl. .............................. 523/179; 521/54; 521/82; 521/92; 521/98; 523/218; 523/219
[58] Field of Search ................................... 523/179, 218, 523/219; 521/82, 54, 92, 98

[56] References Cited

U.S. PATENT DOCUMENTS

| | | | |
|---|---|---|---|
| 4,694,030 | 9/1987 | von Bonin et al. | 521/82 |
| 4,945,015 | 7/1990 | Milner et al. | 521/82 |
| 5,508,321 | 4/1996 | Brebner | 521/91 |

*Primary Examiner*—Morton Foelak
*Attorney, Agent, or Firm*—Flynn, Thiel, Boutell & Tanis, P.C.

[57] ABSTRACT

The invention relates to a mixture for the manufacture of intumescent shaped parts with a composition containing in percentage by weight, 30–60% thermoplastic, 40–70% expandable graphite and 5–40% filler mixture. The mixture does not attack processing machines and has an improved foaming behavior. A particular characteristic of the mixture is that the filler mixture forms OH⁻ ions when it contacts moisture.

7 Claims, No Drawings

SHAPED PARTS OUT OF INTUMESCENT MIXTURES AND A METHOD FOR THE MANUFACTURE OF SAME

This Application is Continuation-In-Part of application Ser. No. 08/790,419 filed Jan. 30, 1997.

DESCRIPTION

The invention relates to compositions used in the manufacture of intumescent shaped parts and which comprises the following components in percentage by weight: 30–60% of a thermoplastic; 40–70% of an expandable graphite; and 5–40% of a filler mixture.

Shaped parts made of intumescent mixtures are utilized for fire protection, namely, to seal off openings during a fire so that the spread of the fire is prevented. These shaped parts expand when they are heated to a certain reaction temperature when exposed to a fire to effect a sealing off of the existing openings based on this increase in volume. Such mixtures are shown, for example, in EP 0 302 987 B1 and EP 0 787 784 A2. A disadvantage of these mixtures is, however, that they contain an acid and machines which process these mixtures are thus attacked at their contact points with the mixtures such that they, in time, are destroyed by corrosion and an economical production of the mixtures or shaped parts is not possible. The mixtures contain acid since the expandable graphite consists of graphite, expandable graphite and approximately 8 percentage by weight of pure free sulfuric acid. The formula of expandable graphite is:

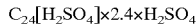

$$C_{24}[H_2SO_4] \times 2.4 \times H_2SO_4$$

One differentiates on the one hand between the sulfuric acid stored in the crystal lattice of the graphite and needed for the thermal expansion reaction, which has no influence whatsoever on the pH-value of the mixture and does not result in the formation of $H_3O^+$ ions in connection with moisture, and on the other hand freely existing sulfuric acid which help determine the pH-value and, with moisture, forms $H_3O^+$ ions. Processing machines are damaged by the free sulfuric acid.

A further disadvantage of the intumescent mixtures according to the prior art is that they are manufactured at high temperatures. At temperatures which are too high, it is already possible for an unintended expanding of the mixture to occur. Furthermore, higher production costs are encountered due to the increased heat.

The purpose of the invention is to provide an intumescent mixture of the above-identified type which can be manufactured at temperatures of below 100° C., does not attack the machines so that an economical production process for the mixture and the resulting shaped parts is possible, and also shows an improved foaming behavior.

The purpose is attained according to the invention in such a manner by the filler mixture being composed such that it forms $OH^-$ ions with moisture.

The free sulfuric acid contained in the expandable graphite is neutralized through the addition of the improved filler mixture which, together with moisture, forms $OH^-$ ions. The neutral mixture no longer attacks product-contacting parts of the processing machines and destroys these parts through corrosion. The manufacture of shaped parts out of the inventive intumescent mixtures in series is thus economical.

According to the invention the pH-value of the filler mixture can lie between 8 and 10. The filler mixture can consist, advantageously, of calcium carbonate and paraffin, which preferably is in the filler mixture in an amount of 70 percentage by weight of calcium carbonate and approximately 30 percentage by weight of paraffin.

The grain size of the expandable graphite lies advantageously between 0.05 and 2.5 mm and the grain size of the thermoplastic can lie between 3 to 5 mm.

The mixture can be manufactured according to the invention out of the following materials: The thermoplastics, the expandable graphite and the filler mixture are mixed in an extruder and the mixture is heated to a temperature not exceeding 100° C.

From this mixture it is then possible to manufacture intumescent shaped parts out of the described mixtures.

The following Table discloses examples of mixtures for intumescent shaped parts. Example 1 of the Table is thereby a mixture which corresponds to the prior art. The mixtures of the Examples 2 to 7 are mixtures according to the present invention and differ in the amounts of the thermoplastic, expandable graphite and calcium carbonate. Polyethylene (PE) has been used as the thermoplastic in all of the examples. The percentages refer to the percentages of the total weight of the respective mixture.

| Example | Polyethylene (wt.%) | Expandable Graphite (wt.%) | Calcium Carbonate Filler (wt.%) | Foam Level in mm |
|---------|--------------------|-----------------------------|----------------------------------|-------------------|
| 1 | 60 | 40 | 0 | 70 |
| 2 | 57.5 | 37.5 | 5 | 72 |
| 3 | 55 | 35 | 10 | 74 |
| 4 | 52.5 | 32.5 | 15 | 77 |
| 5 | 50 | 30 | 20 | 82 |
| 6 | 45 | 25 | 30 | 85 |
| 7 | 40 | 25 | 35 | 86 |

The foam level indicates the foaming behavior of the shaped parts manufactured out of the mixtures. The foam level is defined by the level which the mixture achieves above a defined base surface through expansion after the reaction temperature has been exceeded. From the Table it can be recognized that in Examples 2 to 7, in contrast to Example 1, greater foam levels exist which clearly illustrate the improved expansion characteristics of the inventive mixtures.

The embodiments of the invention in which an exclusive property or privilege is claimed are defined as follows:

1. A composition for manufacturing intumescent shaped parts comprising, in percent by weight:
   30–60% of a thermoplastic;
   40–70% of an expandable graphite; and
   5–40% of a filler mixture,
wherein the filler mixture which consists of calcium carbonate and a paraffin.

2. The composition of claim 1, wherein the filler mixture has a pH of from 8–10.

3. The composition of claim 1, wherein the filler mixture consists of 70 wt. % calcium carbonate and 30 wt. % of a paraffin.

4. The composition of claim 1, wherein the expandable graphite has a grain size of from 0.05–2.5 mm and the thermoplastic has a grain size of from 3–5 mm.

5. A method of manufacturing the composition of claim 1, comprising the steps of mixing the thermoplastic, expandable graphite and filler mixture in an extruder to form a resultant mixture and heating the resultant mixture to a temperature not exceeding 100° C.

6. An intumescent shaped part manufactured from the composition of claim 1.

7. The composition of claim 1, wherein the thermoplastic is polyethylene.

* * * * *

UNITED STATES PATENT AND TRADEMARK OFFICE
CERTIFICATE OF CORRECTION

PATENT NO. : 5,948,834

DATED : September 7, 1999

INVENTOR(S) : Friedhelm Schneider

It is certified that error appears in the above-identified patent and that said Letters Patent is hereby corrected as shown below:

Column 2, line 61, delete "which".

Signed and Sealed this

Nineteenth Day of December, 2000

Attest:

Q. TODD DICKINSON

*Attesting Officer*   *Commissioner of Patents and Trademarks*